United States Patent Office 3,672,922
Patented June 27, 1972

---

3,672,922
BENZYL STARCH EMULSION COATING COMPOSITIONS
Robert E. Brouilliard, Leonard J. Coughlin, and Vernon L. Winfrey, Cedar Rapids, Iowa, assignors to Penick & Ford Limited, Cedar Rapids, Iowa
No Drawing. Filed Jan. 26, 1970, Ser. No. 5,972
Int. Cl. C08b 25/02
U.S. Cl. 106—211
8 Claims

ABSTRACT OF THE DISCLOSURE

An oil-in-water emulsion coating composition for imparting brightness and/or opacity to publication paper, boxboard and the like utilizes a combination binder and emulsifier in the water phase, consisting essentially of dispersed particles of benzyl starch containing from 2 to 20% of ether-linked benzyl groups. Preferably, the starch contains from 5 to 12% benzyl groups. The composition can be utilized as a "bubble" coating.

BACKGROUND AND SUMMARY

Oil-in-water emulsion coating compositions have been known to the paper and paperboard art since at least 1944 (see Kress et al. United States Pat. 2,399, 707). In 1956, Rosenthal obtained a patent on "Coated Paper Suitable for Stylus Inscription and Method of Making Same," which utilized an oil-in-water emulsion coating composition (U.S. Pat. 2,739,909). During the 1960's, a number of patents have issued relating to such coating compositions, including Clancy et al. U.S. Pats. 2,961,334, 3,108,009, and 3,157,553, Reiling et al. 3,002,844 and Webber 3,372,050. Where such emulsion coatings are formulated with volatile hydrocarbon or other organic water-immiscible liquids, they have come to be referred to in the paper industry as "bubble" coatings. See Clancy et al., "Introduction to Bubble Coatings," Tappi, vol. 48, No. 10; pages 51A-53A (1965); and Nadelman, "How to Formulate Non-pigmented and Low-pigmented Opaque Coatings," Paper Trade Journal, pages 70-74, Apr. 25, 1966. A particular requirement of bubble coatings is that the emulsion be stable and contain the dispersed volatile oil in the form of very fine droplets. When the droplets have an average size of 1 to 2 microns or less, the applied bubble coating, after evaporation of the oil, will contain pores or air bubbles of comparable size, the coating will exhibit a light scattering effect, which can provide the coating with both brightness and opacity. The optimum bubble size is apparently about 0.5 to 1 micron. Consequently, the use of highly effective emulsifiers capable of forming oil-in-water emulsions have been considered to be an essential requirement for formulating bubble coating emulsions.

Since the coating must adhere to the surface of the paper or paper board (both as applied and when dried), it has also been considered necessary to incorporate a binder or adhesive material in the water phase of the emulsion. Protein binders, such as casein or soy protein have been considered particularly suitable, since they pass through a gel phase during drying and prevent collapse of the bubble structure, the dried gel phase providing a matrix for the light-refracting bubbles. Other binders have been proposed such as starch binders (see U.S. Pats. Nos. 3,372,044 and 3,372,050). As described in Pat. 3,372,050, attempts to use starch as a binder in emulsion bubble coatings have encountered serious difficulties. Although separate emulsifying agents are believed to be essential, many emulsifying agents interact with the starch, and become ineffective to form and maintain a finely dispersed emulsion. While some specific emulsifying agents can be used, they are relatively expensive, and have not resulted in commercially successful bubble coating compositions. Further, it has been stated (see U.S. Pat. 3,372,050) that starch-based bubble coatings must contain paper-coating pigment.

In accordance with the present invention, the foregoing problems and difficulties are substantially overcome by utilizing benzyl starches as combination binder-emulsifiers. The substitution range (DS) of the benzyl starch is selected so that the starch retains its effectiveness as a binder while at the same time providing sufficient hydrophobic (oleophilic) groups to make it an effective oil-in-water emulsifier. The benzyl starch is utilized in the water phase in the form of fine dispersed particles; the particles preferably being of an average size of not substantially over 1 micron, and optimally of an average size of substantially less than 1 micron. The benzyl starch comprises the sole or at least the principal effective binder, and also functions as the sole or at least the principal emulsifier. For achieving this dual action, the starch should contain from 2 to 20% by weight of ether-linked benzyl groups, and optimally from about 5 to 12% by weight benzyl groups. When particles of such benzyl starch in the micron size range are dispersed in the water phase of the emulsion at concentrations of from 5 to 40% (or preferably 10 to 25%) by weight based on the water, the benzyl starch (without any other emulsifying agent) is capable of forming and maintaining a stable, fine droplet size oil-in-water emulsion. Such emulsions can be utilized as bubble coatings either without pigment or with small or large amounts of pigment, to impart brightness and/or opacity to publication paper, boxboard, and the like. The oil-in-water emulsion coating compositions of this invention can also be utilized for other purposes where the presence of a binder adhesive agent in the water phase is desirable while at the same time avoiding the use of any separate emulsifying agent for dispersing the oil phase.

DETAILED DESCRIPTION

For use in practicing the present invention, the benzyl starch ethers can be prepared as described in the United States patent of Hjermstad et al. No. 3,462,283. In general, a convenient procedure is to etherify the starch in granule form with benzyl chloride in the presence of an alkali such as sodium or potassium hydroxide, and also in the presence of a swelling inhibitor, such as sodium sulphate, sodium chloride, or other alkali metal salts. The etherification is continued without swelling the starch until the desired substitution level is achieved. For the purpose of the present invention, the starch should contain from 2 to 20% by weight benzyl groups, and the optimal substitution level is about 5 to 12% benzyl. The reacted starch suspension is then dewatered, such as by filtration, and washed free of salts and side reaction products. Dispersions of the benzyl starch can then be prepared by the fragmenting procedure described in the above-cited patent 3,462,283, or by other suitable procedures. While benzyl-substituted starches resist cooking, they can be dispersed and reduced to a fine state of subdivision by the use of a continuous cooker, the cooking procedure being described in the United States patent of Winfrey et al. No. 3,133,836. While the use of excess steam, as described in this patent, may be desirable to assure complete dispersion of the starch as micron-sized or sub-micron-sized particles, it has been found that excess steam is not an essential requirement, at least for dispersing benzyl starches of optimum benzyl content for the purposes of the present invention. For example, usable dispersions of 6 to 8% substituted benzyl starch can be obtained at cooking temepratures of 250 to 260° F. in a continuous steam cooker while using only the normal amount of steam. Moreover, if it is desired to employ a batch or atmospheric cooking or dispersing procedure, the dispersibility of the benzyl starch can be enhanced by incorporating a small amount of alkali, such as sodium hydroxide, in the water slurry of the starch while it is being cooked. If the presence of alkali in the resulting starch dispersion is undesirable, or if the dispersion does not exhibit both emulsifying and binding properties to the extent desired, the alkali can be neutralized by a suitable acid, such as hydrochloric or sulfuric acid. If the salt formed by the neutralization is objectionable in the bubble coating composition, which it may be if too high a concentration of salt is present, it will be preferable to utilize the fragmentation procedure described in the above cited Pats. 3,462,283 and 3,133,836. For the purpose of the present invention, the benzyl starch should be fragmented and formed into a dispersion of benzyl starch particles having an average size of not substantially over 2 microns, and preferably less than 1 micron. For example, the size of the benzyl starch particles can range from 0.1 micron or less up to 1 micron. In certain desirable embodiments, the average particle size will range from about 0.5 to 1 micron, although more highly fragmented benzyl starch can be used, such as benzyl starch particles having an average size of less than 0.1 micron.

The concentration of the benzyl starch in the water phase can vary over a considerable range. In general, the concentration of benzyl starch is selected so that it is an effective binder for the coating and at the same time, an effective emulsifier for the dispersed oil phase. It will therefore be understood that the optimum concentration of benzyl starch in the water phase for a particular formulation will depend on the relative proportions of the oil and water phase, as well as the coating use for the formulation. In general, the water phase can advantageously contain from 5 to 40% benzyl starch based on the water, that is from 5 to 40 parts benzyl starch per 100 parts water. Usually at least 7 parts starch per 100 parts water are desirable, and the most advantageous formulations are in the range from at least 5% to 10% up to 25% starch, based on the water. To enable formulations at the higher starch concentrations it is generally advantageous to lower the viscosity of the starch by conventional depolymerizing treatments, for example, by acid-hydrolysis or oxidative conversion with a reagent such as ammonium persulfate.

The relative proportions of the oil and water phases can also vary over considerable range. As formulated for application (prior to drying), the water phase will usually comprise the major part of the formulation. For example, from 0.1 to 1.0 part by weight of oil can be used per part of water, preferably .125 to .33 parts of oil per part of water. Since the starch is to provide the matrix for the oil bubbles during the drying, the water evaporating first, and then the oil, the ratio of starch to oil can be important. For example, from 0.1 to 10 parts by weight of oil can be used per part of benzyl starch, or preferably 1.25 to 3.0 parts of oil per part of starch.

As used herein, the term "oil" is intended to refer to water-immiscible organic liquids. Liquid hydrocarbon oil, such as kerosene, fuel oils, mineral spirits, Stoddard's solvent, etc. are suitable. The oil can also comprise a low melting fat or wax in certain embodiments, but in the formation of the bubble coatings, oils of greater volatility are preferred. The oil should be volatile so that it can be removed by applying heat to the coating. Advantageously, however, the oil can be less volatile than water, thereby permitting substantially all or at least the major portion of the water to be evaporated in advance of the major portion of the oil. In some applications, however, the coatings can be utilized with only partial evaporation of the oil, the water, or both. The water as well as the oil preferably evaporates under ordinary drying conditions for coated paper. For example, the coated paper or paperboard can be dried at a temperature within the range of 150 to 350° F., such as 230 to 240° F.

Where required, the water phase of the coating composition can contain additional ingredients such as pigment. While pigments are not required to impart the desired optical properties of brightness and opacity, they may be incorporated to improve other charatceristics. If pigments are utilized, such as clays, titanium dioxide, etc., it will usually be desirable to employ at least 5 to 10% by weight of the benzyl starch based on the pigment. Higher proportions of starch to pigment can, of course, be used. In general, from 5 to 100 parts by weight of benzyl starch can be used per 100 parts of pigment. With high solids coatings, the preferred range is 10 to 20% starch based on pigment. With size press coatings, the preferred range is 20 to 80% starch based on the pigment.

As described above, the benzyl starch is preferably employed as the sole binder. However, minor proportions of other binders can be incorporated, providing the benzyl starch is present in a concentration where it exhibits the characteristic of forming and stabilizing the emulsion. While auxiliary emulsifying agents can be utilized to either assist in forming and/or instabilizing the emulsion, they are not required, and are preferably omitted.

The emulsion can be formed by well-known procedures in the emulsification art. No special techniques are required. Where the water phase contains the benzyl starch at a binder-effective concentration, the starch will also function as the emulsifier, permitting the emulsion to be formed by intermixing the oil and water phases with sufficient agitation or mixing energy to achieve the dispersion of the oil as fine droplets.

Conveniently, the emulsion coating composition of this invention is further illustrated by the following examples.

EXAMPLE I

Benzyl starches having benzyl contents ranging from around 2% to 18% were slurried in 15% concentration in water and cooked in a continuous starch cooker (see U.S. Pat. 3,133,836) at 300° F. using 3 times the theoretical steam required. One hundred grams of mineral spirits were added to cooked starch suspension containing 50 grams solids under high agitation until stable emulsions were formed. The diameters of the majority of oil droplets in the emulsions were found to be as follows:

TABLE A

| Benzyl content: | Droplet diameter (microns) |
|---|---|
| 1.99 | 2 |
| 2.93 | 2 |
| 4.64 | 2 |
| 6.15 | 1 |
| 8.35 | 1–2 |
| 12.17 | 1 |
| 17.6 | 2 |

The above data show that emulsions can be formed over a wide range of benzyl contents. For emulsion coating of paper benzyl contents of around 5 to 12% gave optimum oil droplet size.

EXAMPLE II

Three paper coating formulations were prepared:

Coating No. 1

Eighty grams of acid modified benzyl corn starch containing 8% by weight of benzyl groups was slurried in 400 grams of water and cooked in the Penick & Ford continuous starch cooker, used in Example I at 300° F. using 3 times the theoretical steam required. A highly dispersed colloidal sol was obtained. To this was added 100 grams of mineral spirits under high agitation. A stable oil-in-water emulsion having micron size particles was formed.

Coating No. 2

Coating clay was added as a 70% slip to emulsion Coating No. 1 using 48% adhesive on clay or about 2 parts of clay to 1 part of benzyl starch and a total solids of 30%.

Standard coating

A standard coating was made from unmodified corn starch converted by an alpha amylase enzyme in the presence of clay using 16.4% starch on clay, to form a standard publication grade of coating.

Coating properties

The coatings were applied to a publication grade raw stock using a wire round rod. The coatings were dried until the hydrocarbon oil was substantially evaporated leaving micron size air bubbles in the coating. The coatings were tested for brightness, opacity, and gloss, both before calendering and after.

The data given below in Table B shows that with very low add-on the emulsion coating made with benzyl starch gave opacity, gloss and brightness equal to or better than standard coatings with much higher add-on weight. Calendering the emulsion coatings did not decrease opacity and brightness.

In comparing the data of Table B, it should be understood that Formula No. 1 was unpigmented and that Formula No. 2 was pigmented. The footnotes of the table identify the standard test, and set out citations to the complete test procedure.

particles have an average size of not substantially over 2 microns.

4. The coating composition of claim 1 in which the weight ratio of the oil in said oil phase to the water in said water phase is within the range from 0.1 to 1.0 part of oil per part of water, and said oil is dispersed at an average droplet size of less than 10 microns.

5. An oil-in-water emulsion coating composition for imparting brightness and/or opacity to publication paper, boxboard, and the like, said emulsion having a finely dispersed volatile liquid oil phase and a continuous water phase containing a water binder and an emulsifier, wherein the improvement comprises utilizing a combination binder and emulsifier in said water phase consisting essentially of dispersed particles of benzyl starch containing from about 5.5 to 9.5% by weight benzyl groups, said dispersed particles being present in said water phase at a concentration of from 5 to 25% by weight based on the water.

6. The coating composition of claim 5 in which said oil phase is dispersed at an average droplet size of less than 2 microns, and said dispersed starch particles have an average size of less than 1 micron.

7. The coating composition of claim 5 in which the weight ratio of the oil in said oil phase to the water in said water phase is within the range from 0.1 to 1.0 part of oil per part of water.

TABLE B

| Formula | Average coat weight [1] | Caliper PLI [2] | G.E. Bright [3] Wire | G.E. Bright [3] Felt | B and L opacity [4] | Gardner gloss [5] Sheet Wire | Gardner gloss [5] Sheet Felt | Gardner gloss [5] Print Wire | Gardner gloss [5] Print Felt | Caliper [6] |
|---|---|---|---|---|---|---|---|---|---|---|
| #1 | 2#/side | 1-N/500 each side | [7] 76.8 | [7] 76.8 | 93.0–90.00 | 53 | 54 | 68 | 67 | 3.0 |
| #2 | 3#/side | 4-N/500 | 71.0 | 71.2 | 92.4–89.2 | 46 | 49 | 59 | 59 | 2.8 |
| Standard 36# production sheet | 4#/side | | 68.4 | 66.5 | 90.5 | 41 | 39 | 61 | 50 | 2.2 |

[1] Coating weight determined by weighing coated and uncoated sheet.
[2] Calender, pounds per linear inch (N=nips).
[3] TAPPI Standards—T452 m-58.
[4] TAPPI Standards—T-425 m-60.
[5] TAPPI Standards—T-424 h-63.
[6] TAPPI Standards—T-411.
[7] Before calibration.

We claim:

1. An oil-in-water emulsion coating composition for imparting brightness and/or opacity to publication paper, boxboard, and the like, said emulsion having a finely dispersed volatile liquid oil phase and a continuous water phase containing a water binder and an emulsifier, wherein the improvement comprises utilizing a combination binder and emulsifier in said water phase consisting essentially of dispersed particles of benzyl starch containing from 5 to 12% by weight of ether-linked benzyl groups, said dispersed particles being present in a binder-effective concentration at which said particles exhibit the characteristic of forming and stabilizing said emulsion.

2. The coating composition of claim 1 in which said oil phase is dispersed at an average droplet size less than 2 microns, whereby said composition can be used as a bubble coating.

3. The coating composition of claim 1 in which said water phase contains from 5 to 25% by weight based on the water of said benzyl starch and said dispersed starch 8. The coating composition of claim 7 in which said oil phase is dispersed at an average droplet size of less than 1 micron, whereby said composition can be used as a bubble coating.

References Cited

UNITED STATES PATENTS

| 2,740,724 | 4/1956 | Wrigley | 106—213 |
| 3,062,810 | 11/1962 | Hjermstad | 260—233.3 |
| 3,002,844 | 10/1961 | Reiling | 106—129 |
| 3,372,044 | 3/1968 | Weber | 106—130 |
| 3,462,283 | 8/1969 | Hjermstad | 106—213 |

THEODORE MORRIS, Primary Examiner

U.S. Cl. X.R.

106—213; 252—312